(12) United States Patent
McRae (10) Patent No.: US 12,548,370 B2
(45) Date of Patent: Feb. 10, 2026

(54) FACE IDENTIFICATION SYSTEM USING MULTIPLE SPECTRUM ANALYSIS

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 475 days.

(21) Appl. No.: 17/951,257

(22) Filed: Sep. 23, 2022

(65) Prior Publication Data

US 2023/0095323 A1  Mar. 30, 2023

Related U.S. Application Data

(60) Provisional application No. 63/247,918, filed on Sep. 24, 2021.

(51) Int. Cl.
*G06V 40/16* (2022.01)
*G06V 10/143* (2022.01)

(52) U.S. Cl.
CPC .......... *G06V 40/172* (2022.01); *G06V 10/143* (2022.01); *G06V 40/166* (2022.01)

(58) Field of Classification Search
CPC .... G06V 40/172; G06V 40/16; G06V 40/168; G06V 20/52; G06V 10/143; G06V 40/166; G06V 40/40
See application file for complete search history.

(56) References Cited

U.S. PATENT DOCUMENTS 9,251,427 B1 * 2/2016 Chu .......................... G06T 7/50
11,574,484 B1 * 2/2023 Linzer ..................... G06T 7/521
(Continued)

FOREIGN PATENT DOCUMENTS

CA           3057222        4/2021
CN        102024145 A  *   4/2011
(Continued)

OTHER PUBLICATIONS

A. Alanazi, T. Al-Hadhrami, F. Saeed and K. Awuson-David, "Wireless Remote Control-Security System for Entrances (WRC-SSE)," 2021 International Congress of Advanced Technology and Engineering (ICOTEN), Taiz, Yemen, 2021, pp. 1-8, doi: 10.1109/ICOTEN52080.2021.9493429. (Year: 2021).*

(Continued)

*Primary Examiner* — Michael Robert Cammarata
(74) *Attorney, Agent, or Firm* — Boyle Fredrickson, S.C.

(57) ABSTRACT

A camera of a monitoring system detects electromagnetic radiation in at least two different spectrums. The system includes a database of stored images, where the stored images are stored in pairs of images corresponding to each spectrum and to a common face. A controller identifies a match from among the stored images by comparing the first image obtained by the camera in the first spectrum to each of the first images in the database and by comparing the second image obtained from the camera in the second spectrum to the corresponding second image stored in the database. A match is identified when the first image and the second image from the camera match the first image and the corresponding second image for a pair of images in the database.

18 Claims, 6 Drawing Sheets

(56) References Cited

U.S. PATENT DOCUMENTS

| | | | |
|---|---|---|---|
| 11,594,072 B1* | 2/2023 | Trani | G06V 20/52 |
| 2004/0005086 A1 | 1/2004 | Wolff et al. | |
| 2012/0257800 A1* | 10/2012 | Zheng | G06V 40/169 |
| | | | 382/118 |
| 2014/0240492 A1* | 8/2014 | Lee | H04N 23/667 |
| | | | 348/136 |
| 2016/0019421 A1 | 1/2016 | Feng et al. | |
| 2017/0010090 A1 | 1/2017 | Wan et al. | |
| 2018/0039845 A1* | 2/2018 | Chen | G06V 40/166 |
| 2018/0131881 A1* | 5/2018 | Kobayashi | H04N 25/445 |
| 2019/0041660 A1* | 2/2019 | Ahmed | G02B 27/48 |
| 2019/0278976 A1* | 9/2019 | Khadloya | G08B 13/19656 |
| 2020/0019808 A1* | 1/2020 | Lu | G06V 40/172 |
| 2020/0334450 A1* | 10/2020 | Shen | G06V 10/803 |
| 2022/0067132 A1* | 3/2022 | Learmonth | G06V 40/161 |
| 2023/0054197 A1* | 2/2023 | Richards | G06F 18/214 |

FOREIGN PATENT DOCUMENTS

| | | | | |
|---|---|---|---|---|
| CN | 101964056 B | * | 6/2012 | |
| CN | 105023005 A | * | 11/2015 | G06K 9/00221 |
| CN | 108256427 A | * | 7/2018 | |
| CN | 110110582 A | * | 8/2019 | |
| CN | 110532992 A | * | 12/2019 | G06K 9/00228 |
| CN | 211349389 U | * | 8/2020 | |
| CN | 112036222 A | * | 12/2020 | G06K 9/00288 |
| CN | 112528949 A | * | 3/2021 | G06K 9/00255 |
| CN | 113099091 A | | 7/2021 | |
| KR | 102160940 B1 | * | 9/2020 | |
| WO | WO-2016084926 A1 | * | 6/2016 | G01C 3/06 |

OTHER PUBLICATIONS

M. Kristo and M. Ivasic-Kos, "An overview of thermal face recognition methods," 2018 41st International Convention on Information and Communication Technology, Electronics and Microelectronics (MIPRO), Opatija, Croatia, 2018, pp. 1098-1103, doi: 10.23919/MIPRO.2018.8400200 (Year: 2018).*

S. Boutarfass and B. Besserer, "Using Visible+NIR information for CNN face recognition," 2018 7th European Workshop on Visual Information Processing (EUVIP), Tampere, Finland, 2018, pp. 1-6, doi: 10.1109/EUVIP.2018.8611681. (Year: 2018).*

Kai Guo et al., "Face recognition using both visible light image and near-infrared image and deep network", (2017) Mar. 2017, CAAI Transaction on Intelligence Technology, vol. 2, Issue 1, pp. 39-47. (Year: 2017).*

* cited by examiner

FACE IDENTIFICATION SYSTEM USING MULTIPLE SPECTRUM ANALYSIS

CROSS-REFERENCE TO A RELATED APPLICATION

This application claims the benefit of provisional patent application U.S. App. No. 63/247,918, filed on Sep. 24, 2021 and entitled "Face Identification System Using Multiple Spectrum Analysis", the entire contents of which are hereby expressly incorporated by reference into the present application.

BACKGROUND OF THE INVENTION

1. Field of the Invention

The present invention relates to a system and method of facial identification. The present invention more particularly relates to a monitoring system including an imaging device configured to receive light in at least two frequency spectrums and to use light from each frequency spectrum for facial recognition.

2. Discussion of the Related Art

Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Arlo Technologies, Inc., the content of which is incorporated herein by reference. The wireless camera can be connected to a Wi-Fi™ enable base station (BS) or access point (AP).

In addition to simply transmitting or recording images, video, and sound, such cameras may include additional features. For instance, cameras, and/or monitoring systems incorporating them, have become equipped with computer vision (CV) software with facial recognition, permitting the identification of an individual based on specific characteristics of the individual's facial features. CV also can be used to identify other objects such as vehicles, animals, packages, etc.

While previous cameras and/or associated monitoring systems have become equipped to perform facial recognition, they are not without certain drawbacks. For instance, the CV software is commonly configured to capture an image of a person's face from a video stream and match the image to a database of known images. The CV software may be tricked into misidentification by an individual holding up a 3-D mask or even a printed image of another person in front of the camera.

Thus, it would be desirable to provide an improved system and method for facial recognition using cameras in a monitoring system.

SUMMARY OF THE INVENTION

The subject matter disclosed herein describes an improved system and method for facial recognition using one or more cameras in a monitoring system. The system is configured to detect electromagnetic radiation in at least two different spectrums. In one aspect, the system detects electromagnetic radiation in both a visible spectrum and an infrared spectrum. The system may include a single sensor configured to detect the electromagnetic radiation in both spectrums, or the system may include a first sensor to detect the electromagnetic radiation in the first spectrum and a second sensor to detect the electromagnetic radiation in the second spectrum. The system includes a database of stored images, where the stored images are stored in pairs of images, and each pair of images corresponds to a common face. The first stored image for the face was obtained in the first spectrum, and the second stored image for the face was obtained in the second spectrum.

A controller for the monitoring system identifies a match from among the stored images by comparing the first image obtained by the camera in the first spectrum to each of the first images in the database. When the controller identifies a potential match between the first image obtained by the camera and an image in the database which was obtained in the same spectrum as the first image obtained from the camera, the controller compares the second image obtained by the camera in the second spectrum to the corresponding second image stored in the database. In order to identify a match, both the first image and the second image obtained from the camera must match the first image and the corresponding second image for a pair of images stored on the database. Having identified a match, the controller provides a notification to a user device identifying the match.

According to one aspect of the invention, a method of facial identification includes receiving a first image in a first spectrum at a controller and receiving a second image in a second spectrum at the controller, where the first image and the second image include a common face. A potential match to the common face is identified using a facial detection module configured to execute on the controller. The potential match includes the common face in a corresponding first image and a corresponding second image. Each of the corresponding first and second images are stored in a storage module in communication with the controller, and the facial detection module is configured to identify the first image received at the controller as a match to the corresponding first image stored in the storage module. The potential match is confirmed using the facial detection module by identifying the second image received at the controller as a match to the corresponding second image stored in the storage module.

According to another aspect of the invention, the first image and the second image are obtained from a field of view with at least one sensor. The sensor could, for example, be a camera capable of acquiring images in both the visible and UV spectra. The first image and the second image are transmitted from the at least one sensor to the controller.

In a further aspect of the invention, the at least one sensor may be configured to detect electromagnetic radiation in both the first spectrum and the second spectrum. The at least one sensor may include an array of first sensing elements configured to detect the electromagnetic radiation in the first spectrum and an array of second sensing elements configured to detect the electromagnetic radiation in the second spectrum. According to an alternate aspect of the invention, the at least one sensor includes a first sensor configured to obtain the first image in the first spectrum and a second sensor configured to obtain the second image in the second spectrum.

The system may be configured to cause a notification, such as a push notification, to be sent to a user device when the potential match is confirmed. The storage module may be configured to store an identifier corresponding to each pair of first and second images stored in the storage module and the push notification may include the identifier. The system may also be configured to execute a smart home function, such as lighting system or a lock, upon confirming the potential match.

According to another embodiment of the invention, a system for facial identification includes at least one sensor configured to obtain a first image in a first spectrum and a second image in a second spectrum from a field of view and a controller. The controller is configured to receive the first image and the second image from the at least one sensor and to identify a potential match to the first image via a facial detection module. The potential match includes a corresponding first image and a corresponding second image and each of the corresponding first and second images are stored in a storage module in communication with the controller. The facial detection module is configured to identify the first image received from the at least one sensor as a match to the corresponding first image stored in the storage module. The controller is further configured to confirm the potential match via the facial detection module, where the facial detection module is further configured to identify the second image received from the at least one sensor as a match to the corresponding second image stored in the storage module.

According to yet another embodiment of the invention, a system for facial identification includes a monitoring device and a base station. The monitoring device includes at least one sensor, configured to obtain a first image and a second image from a field of view, and a first communication device, configured to transmit the first image and the second image. The first image is in a first spectrum and the second image is in a second spectrum. The base station includes a second communication device and a controller. The second communication device is complementary to and in communication with the first communication device to receive the first image and the second image from the monitoring device. The controller is configured to receive the first image and the second image from the at least one sensor and identify a potential match to the first image via a facial detection module. The potential match includes a corresponding first image and a corresponding second image, and each of the corresponding first and second images are stored in a storage module in communication with the controller. The facial detection module is configured to identify the first image received from the at least one sensor as a match to the corresponding first image stored in the storage module and to confirm the potential match. The facial detection module is further configured to identify the second image received from the at least one sensor as a match to the corresponding second image stored in the storage module.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
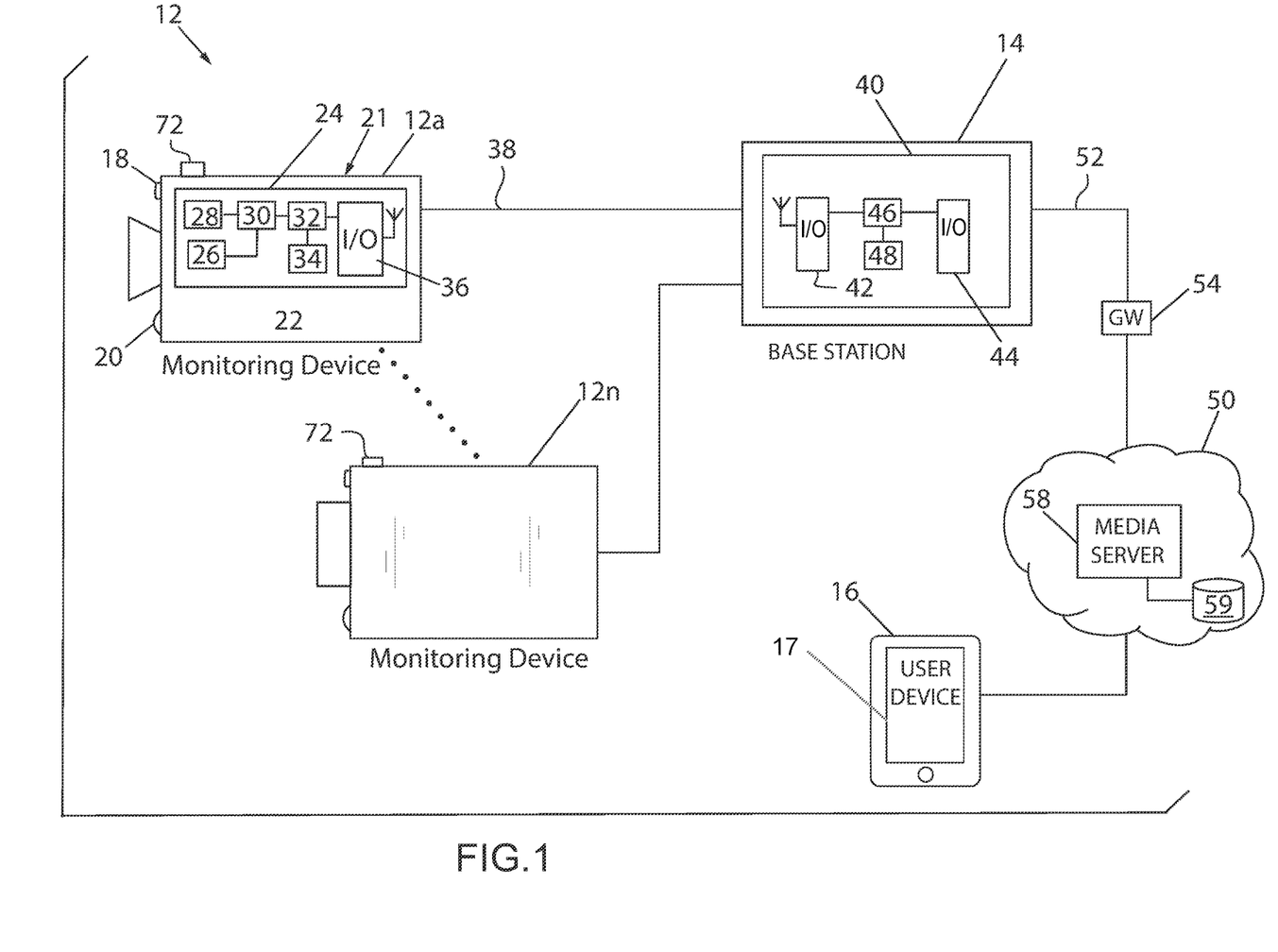
FIG. 1 is a schematic representation of a monitoring system according to aspects of the invention.

Referring now to FIG. 1, in accordance with an aspect of the invention, an electronic system 10 for real-time monitoring can include one or more monitoring devices 12 and a hub or base station 14. A number "n" 12*a*-12*n* of monitoring devices 12 are schematically illustrated in FIG. 1. Unless otherwise specified, references to monitoring device(s) 12 shall apply equally to all monitoring devices 12*a*-12*n*. One or more user devices 16, such as a smart phone, tablet, laptop, or PC, communicate with the base station 14. Each user device includes a display that typically includes both an audio display and a video display 17, internal computing and storage capabilities, and a program or application servicing as a user interface with the remainder of the system 10. In the case of a smart phone, the display typically will include a touch screen and a speaker.

Each monitoring device 12 is configured to acquire data and to transmit it to the base station 14 for further processing and/or transmission to a server and/or the user device(s) 16. Each monitoring device 12 may be battery powered or wired. Several such monitoring devices may be mounted around a building or other structure or area being monitored. For example, in the case of a residential home, monitoring devices 12 could be mounted by each entrance, selected windows, and even on a gate or light pole. A monitoring device 12 also could be incorporated into or coupled to a doorbell, floodlight, etc. The monitoring devices 12 may comprise any combination of devices capable of monitoring a designated area such as a home, office, industrial or commercial building, yard, parking or storage lot, etc. Each individual monitoring device 12 may monitor one or a combination of parameters such as motion, sound, temperature etc. Each of the individual monitoring devices 12*a*-12*n* may be or include still or video cameras, temperature sensors, microphones, motion sensors, etc. At least one such monitoring device, shown at 12*a* in FIG. 1, is an imaging device described in more detail below. The data acquired by imaging device 12*a* a typically will correspond to a video image, and each imaging device 12*a* may be or include a camera such as a video camera 21.

Still referring to FIG. 1, one or more of the imaging devices, including device 12*a*, may also include a microphone 18, visible and/or infrared (IR) lights 20, a power supply 22 such as a battery or battery pack, and/or imaging device electronic circuitry 24. Circuit 24 may include one or more imagers 26, an audio circuit 28, a media encoder 30, a processor 32, a non-transient memory storage 34 and/or a wireless I/O communication device 36, among other things.

Still referring to FIG. 1, Each monitoring device 12 can communicate with the base station 14 through a network 38. It is contemplated that the network 38 may be in whole or in part a wired network, a wireless network, or a combination thereof. The network 38 may include a private Wireless Local Area Network (WLAN) 38, hosted by the base station 14 operating as an access point. One such network is an IEEE 802.11 network. The hub or base station 14 can include base station electronic circuitry 40 including a first wireless I/O communication device 42 for communicating with the monitoring devices 12 over the WLAN 38, a second wired or wireless I/O communication device 44 for accessing a Wide Area Network (WAN) 50, such as the Internet through a Local Area Network (LAN) 52 connected to a Gateway and/or Router 54, a processor 46 and/or a non-transient memory storage 48, among other things. The base station 14 also could be combined with a router 54 or another device in a single module, which would still be considered a "base station" within the meaning of the present disclosure. It should be apparent that "circuitry" in the regard can comprise hardware, firmware, software, or any combination thereof. In one aspect, the monitoring devices 12 could be Arlo® cameras, and the base station 14 could be an Arlo base station, each available on a stand-alone basis or as part of any of a number of systems available from Arlo Technologies, Inc. of Carlsbad, California.

The base station 14 may also be in communication with a server 58, which may be a cloud-server accessible via the WAN 50. The server 58 can include or be coupled to a microprocessor, a microcontroller or other programmable logic element (individually and collectively considered "a controller") configured to execute a program. Alternatively, interconnected aspects of the controller and the programs executed by it could be distributed in various permutations within the monitoring device 12, the base station 14, the user device 16, and the server 58. This program may be utilized in filtering, processing, categorizing, storing, recalling and transmitting data received from the monitoring devices 12 via the base station 14.

This program, while operating at the server level, may be utilized in filtering, processing, categorizing, storing, recalling and transmitting data received from the monitoring devices 12 via the base station 14. Server 58 may also be in communication with or include a computer vision program ("CV"), also referred to as a facial detection module, which can apply one or more filters or processes, such as edge detection, facial recognition, motion detection, etc., to detect one or more characteristics of the recording such as, but not limited to, identifying an individual, animal, vehicle, or package present in the recording. The CV also could be located, at least in part, in other devices, including the imaging devices 12*a*, etc. The CV and further capabilities will further be described below.

In operation, each monitoring device 12 can be configured, through suitable mounting of the monitoring device 12 and/or through suitable manipulation of its controls, to monitor an area of interest, such as a part of a building or section of property. In the case of imaging device 12*a*, the device 12*a* may capture an image automatically upon detection of a triggering event and/or upon receipt of a command from a user device 16. An image also may be captured automatically upon detection of a triggering event detected by a detector. Whether the monitoring device is an imaging device or some other device, the triggering event may be motion, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from a monitoring device 12 of a triggering event, the system 10 can generate an alert such as a push notification ("PN") and send it to one or more user devices 16 for indicating the triggering event.

In the case of the monitoring device being an imaging device 12*a* having a camera, whether camera operation is triggered by a command from a user device 16 or by detection of a triggering event, the camera 21 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

The media stream may then be transmitted via the WAN 50 to a remote data storage device 59 in communication with a media server 58 for data storage and processing. The storage device 59 may be a cloud-based storage device, and the media server 58 may be a cloud server accessible via a wireless connection. Server 58 may also communicate with or include a computer vision program ("CV"), which can apply one or more filters or processes, such as edge detection, facial recognition, motion detection, etc., to detect one or more characteristics of the recording such as, but not limited to, identifying an individual, animal, vehicle, or package present in the recording. A filtered or otherwise processed image can then be displayed on the user device 16, along with additional visual and/or audio messaging such as a text and/or audio message identifying a generic or particular person or object.

Figure 2:
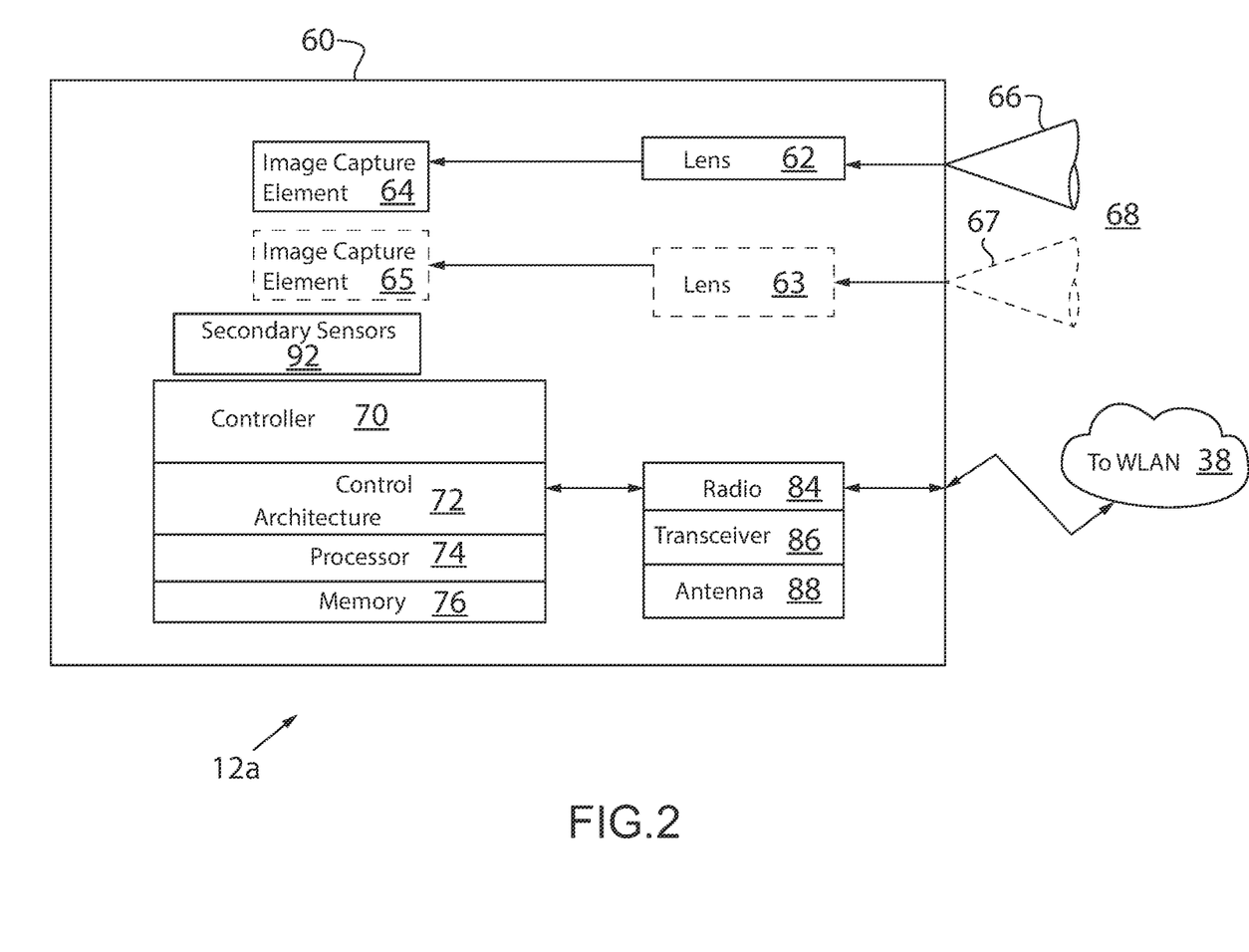
FIG. 2 is a block diagram representing an imaging device shown in FIG. 1.

FIG. 2 represents an example of imaging device 12*a* shown in FIG. 1. In the illustration, the imaging devices 12*a* has a small and compact housing 60 for enclosing and protecting the various camera components illustrated as blocks in FIG. 2. The imaging device 12*a* includes a lens 62 and an image capture element (or primary sensor) 64. The image capture element 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The image capture element 64 may capture images in suitable wavelengths on the electromagnetic spectrum. The image capture element 64 may capture color images and/or grayscale images.

The imaging device 12*a* has a field of view 66 extending radially from the outwardly facing lens 62. The field of view 66 is a portion of the environment 68 within which the imaging device 12*a* can detect electromagnetic radiation via the lens 62 and image capture element 64. The imaging device 12*a* is configured to capture images. An image is a digital representation of a scene for the environment 68 as captured by the imaging device 12*a*. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation.

According to one aspect of the invention, the image capture element 64 can be configured to detect light in two different spectra, such as the visible spectrum and in the infrared spectrum. The visible spectrum includes electromagnetic radiation having wavelengths from about four hundred nanometers to about seven hundred nanometers (400-700 nm). The infrared spectrum includes electromagnetic radiation having wavelengths from about seven hundred nanometers to about one millimeter (700 nm-1 mm) The image capture element 64, or image sensor, typically includes at least one, and more typically, an array of individual image capturing elements. In one embodiment of the invention, each image capture element 64 may be configured to detect electromagnetic radiation over both the visible and infrared spectrums or over at least a portion of the visible and infrared spectrums. It is also contemplated that the sensor array may be configured to include one or more first image capturing elements and one or more e second image capturing elements, where each first image capturing element is configured to detect electromagnetic radiation in the visible spectrum and each second image capturing element is configured to detect electromagnetic radiation in the infrared spectrum. The first and second image capturing elements may be alternately arranged within the array of sensing elements, and control signals may alternately activate each of the first image capturing elements and each of the second image capturing elements. A first image, corresponding to the visible spectrum, is obtained when the first image capturing elements are activated, and a second image, corresponding to the infrared spectrum, is obtained when the second image capturing elements are activated.

According to another embodiment of the invention, a second image capturing element 65 and a second lens 63, shown in broken lines in FIG. 2, may be mounted within the housing 60 of the imaging device 12*a*. The first image capturing element 64 may be configured to detect electromagnetic radiation in the visible spectrum, and the second image capturing element 65 may be configured to detect electromagnetic radiation in the infrared spectrum. According to the illustrated embodiment in FIG. 2, the second image capturing element 64 receives electromagnetic radiation for a second field of view 67 via the second lens 63. The first lens and second lens may be positioned proximate each other such that the field of view 66 for the first lens 62 substantially overlaps the field of view 67 for the second lens 63.

According to still another embodiment of the invention (not shown), the imaging device 12*a* may have a single lens 62 and two image capturing elements 64, 65. The first image capturing element 64 is configured to detect electromagnetic radiation in the visible spectrum, and the second image capturing element 65 is configured to detect electromagnetic radiation in the infrared spectrum. The lens 62 may be configured to split the incoming electromagnetic radiation into two paths such that the received electromagnetic radiation is incident on each of the first image capturing element 63 and the second image capturing element 65. Alternately, an optical splitter device may be inserted between the lens 62 and the image capturing elements 65. According to still another option, the first image capturing element 63 and the second image capturing element 65 may be positioned proximate to each other within the housing 60 such that the electromagnetic radiation received at the lens 62 may be passed through the lens to both image capturing elements 63, 65.

Still referring to FIG. 2, the imaging device 12*a* has a controller 70 including a control architecture 72 having a processor 74 and a memory 76. Of course, the controller could similarly have multiple processors, such as dual processors and accompanying memory. The processor 74 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 74 can include a hardware circuit (e.g., an integrated circuit) configured to carry out instructions contained in program code.

The memory 76 stores one or more types of instructions and/or data. The memory 76 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 76 can be a component of a processor, can be operatively connected to a processor for use thereby, or a combination of both. The memory 76 can include various instructions stored thereon. For example, the memory 76 can store one or more modules. Modules can be or include computer-readable instructions that, when executed by a processor, cause a processor to perform the various functions disclosed herein. While functions may be described herein for purposes of brevity, it is noted that the functions are performed by the processor 74 using the instructions stored on or included in the various modules described herein. Some modules may be stored remotely and accessible by a processor using, for instance, various communication devices and protocols.

The imaging device 12*a* communicates wirelessly (e.g., with the base station 14) via an input/output device or a communications device, typically a radio 84. An example of a radio includes a wireless local area network (WLAN) radio. With the WLAN radio 84, the imaging device 12*a* generally communicates over a short-range wireless communication network, such as the WLAN 38. In one implementation, the radio 84 includes a transceiver 86 for transmitting and receiving signals to and from the base station 14, via an antenna 88. The transceiver 86 can be separate from or part of the control architecture 72. The wireless communication can be as prescribed by the IEEE 802.11 standards in accordance with the Wi-Fi™ communication protocol. It is appreciated, however, that the imaging device 12*a* can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 84 can communicate over multiple frequency bands.

The imaging devices 12a 12 can further include secondary sensors 92. For example, a secondary sensor 92 may be a microphone, a motion sensor, a temperature sensor, an image sensor, and a vibration sensor.

An exemplary camera capable of incorporating aspects of the invention is an Arlo Ultra brand camera available from Arlo Technologies in Carlsbad, California, US. Before moving to other components of the system 10, it should be understood by somebody skilled in the art that the imaging devices 12a includes many additional conventional components typically found in a wireless camera. Further discussion regarding these components is not provided herein since the components are conventional.

Figure 3:
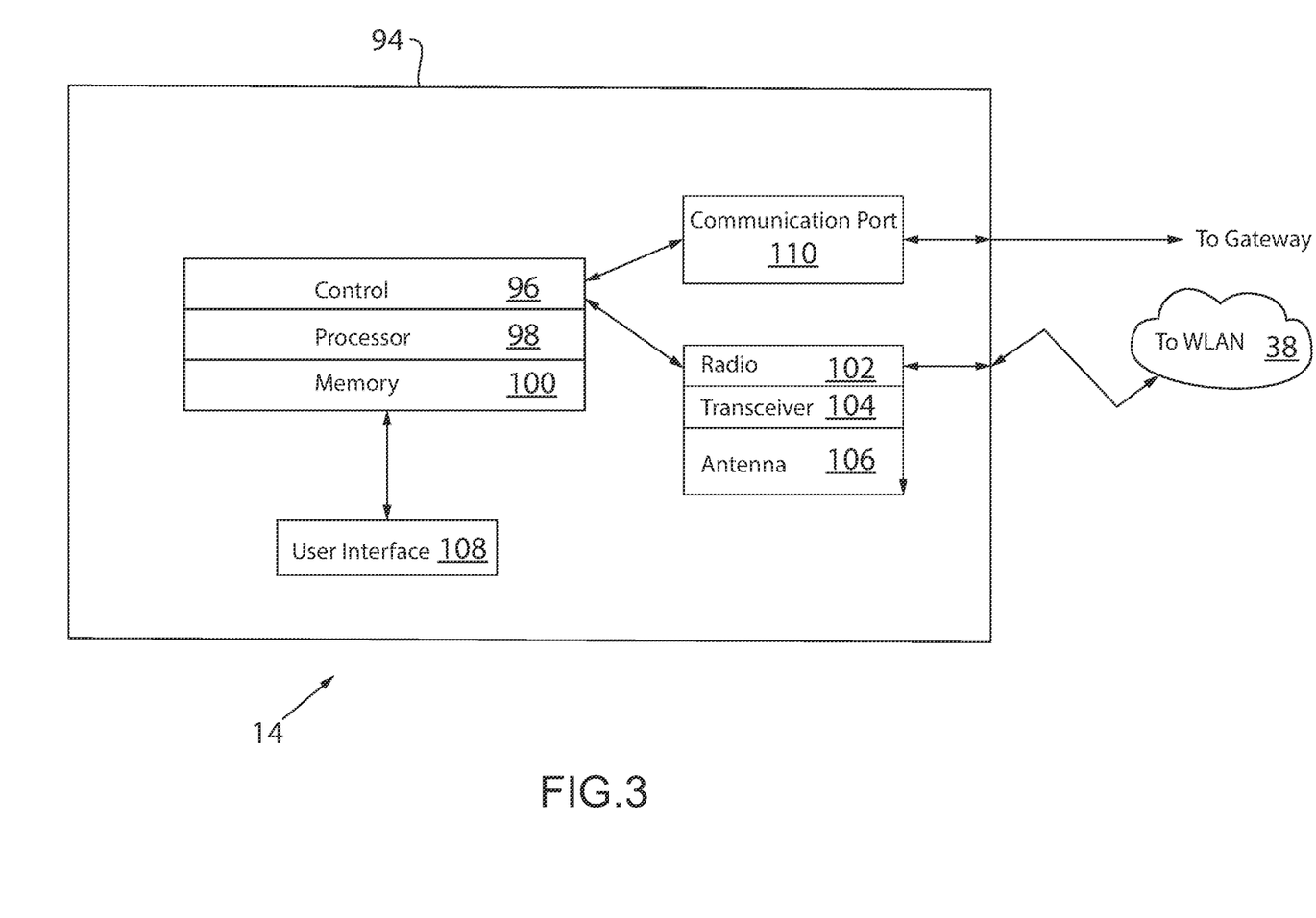
FIG. 3 is a block diagram representing a base station shown in FIG. 1.

Turning now to FIG. 3, an example of the base station 14 shown in FIG. 1 is schematically shown. The base station 14 has a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory.

The processor 98 can include a component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other or one or more processors can work in combination with each other.

The base station 14 includes a memory 100 for storing one or more types of instructions and/or data. The memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 100 can be a component of the processor 98, can be operatively connected to the processor 98 for use thereby, or a combination of both.

In one or more arrangements, the controller can include various instructions stored thereon. For example, the controller can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of the controller using the instructions stored on or included in the various modules. Some modules may be stored remotely and accessible by the processor 98 or another portion of the controller using, for instance, various communication devices and protocols.

The base station 14 communicates wirelessly (e.g., with the imaging devices 12) via a radio 102. An example of a radio includes a wireless local area network (WLAN) radio. With the WLAN radio 102, the base station 14 generally communicates over a short-range wireless communication network, such as the WLAN 38. In one implementation, the radio 102 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 102 can communicate over multiple frequency bands.

The base station 14 may also include a user interface 108. The user interface 108 can include an input apparatus and an output apparatus. The input apparatus includes a device, component, system, element, or arrangement or groups thereof that enable information/data to be entered into the base station 14 from a user. The output apparatus includes any device, component, or arrangement or groups thereof that enable information/data to be presented to the user. The input apparatus and the output apparatus can be combined as a single apparatus, such as a touch screen commonly used by many electronic devices.

The base station 14 includes a communication port 110, which is configured to provide a communication interface between a larger computer network, such as the Internet via the gateway router 54.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub brand base station available from Arlo Technologies in Carlsbad, California, US. Before moving to the operation of the system 10, it should be well understood by somebody skilled in the art that the base station 14 includes many additional conventional components typically found in a base station or access point.

As briefly mentioned above, the computer vision program ("CV"), or facial detection module, stored in or accessible by the controller on the server 58 may be equipped with additional features to enhance operating capabilities of system 10. For purposes of discussion, the CV program will be discussed with respect to execution on the server 58. However, it is understood that controller may refer to the controller on the server 58, the controller 70 on the imaging device 12a, the controller 96 on the base station 14, or a combination thereof. Each controller includes memory configured to store instructions and a processor configured to execute the stored instructions. Modules may be stored in the memory for any of the devices and executed by the corresponding processor. The imaging device 12a is in communication with the base station 14, and the base station 14 is in communication with the server 58. Thus, a portion of the processing, which will be described with respect to the CV program, may be executed on any controller and the output of the processing communicated to another processor for another portion of the processing.

The CV program is configured to perform facial identification using images captured in at least two different spectrums. A spectrum is a range of frequencies within the overall range of electromagnetic radiation. Electromagnetic radiation is commonly divided into the following spectrums: radio, microwave, infrared, visible, ultraviolet, x-ray, and gamma-ray. The imaging device 12a is commonly configured to detect electromagnetic radiation in the visible spectrum. Sensors 64 configured to detect electromagnetic radiation in the visible spectrum generate images, capturing data at a single instant in time, or videos, capturing a series of images over a duration of time. The visible spectrum corresponds to the range of electromagnetic radiation detected by the human eye, and cameras configured to detect radiation in the visible spectrum are, therefore, the most common type of camera. The imaging device 12a may also be configured to detect electromagnetic radiation, for example, in the ultraviolet spectrum, above the visible spectrum, or the infrared spectrum, below the visible spectrum. These cameras may similarly generate images or video corresponding to the electromagnetic radiation detected by sensors in the respective range of frequencies.

The CV program uses an image captured from the imaging device 12a to perform facial recognition. As is understood in the art, there are numerous digital processing methods that may be applied to an image to generate an identifier for an image. The identifier is also referred to as a signature for the image. The CV program may utilize different color models, such as Red-Green-Blue (RGB), Cyan-Magenta-Yellow-Key/Black (CMYK), or a grayscale. The CV program may measure characteristics of light, such as saturation, brightness, or hue of the color on the color scale. Each pixel of the sensor 64 generates a unique value corresponding to the measured characteristic. The values for a single image may be stored, for example, in an array. As discussed above, individual sensing elements, corresponding to each pixel, may similarly be configured in a physical array. The array of values may be arranged in correspondence to the physical arrangement of the individual sensing elements. The array of values may be stored directly and used for subsequent comparison. Alternately, the array of values may be passed through a function to generate a unique signature identifying the image. According to still another embodiment, each value obtained from individual sensing elements may be passed directly to a function which generates a unique signature for the image as a function of each value. The unique signature may be stored and significantly reduce the size of data storage per image. Still other methods of identifying an image may be utilized and a value, or set of values, may be stored corresponding to the image. The above-described methods of generating a signature for an image are exemplary and not limiting.

In practice, the face of each individual will generate a unique value or set of values in the visible spectrum that may be utilized to subsequently identify the individual. As discussed above, an image may be stored as an array of values or as a signature corresponding to the array of values. When an image in the visible spectrum contains the face of an individual, the portion of the image containing the face will contain a series of unique values which are generated by each individual sensing element and which correspond to the individual face. If the same face is captured in multiple images, there will be some variation between the unique values generated in each image due, for example, movement of the face or part of it (such as closing one's eyes), variations in ambient lighting, time of day, environmental conditions, and the like. However, the values generated will be within an expected deviation from each other such that the CV program may identify a face from a second image as a match with a face in the first image. The CV program may utilize the array of unique values corresponding to the face or a digital signature for the array of unique values corresponding to the face to identify a match.

However, as mentioned above, the potential exists to fool the CV program into identifying a matching image of a face. A first individual may obtain a copy of an image of a second individual and print out the image of the second individual on medium, such as paperboard, cardboard, or the like in a size sufficient to place in front of the face of the first individual. When the first individual approaches the imaging device 12a, the first individual could hold up the printed image such that the imaging device 12a captures a new image corresponding to the printed image of the second individual rather than capturing an image of the first individual. If only the image in the visible spectrum is used, the CV program could then identify a match to the second individual. As further indicated below, the base station 14 and the electronic system 10 may be configured to perform certain tasks based on facial recognition, and a task may subsequently be performed based on the false identification of the printed image. Thus, it is desirable to prevent such unauthorized execution based on a printed image.

Figure 5A:
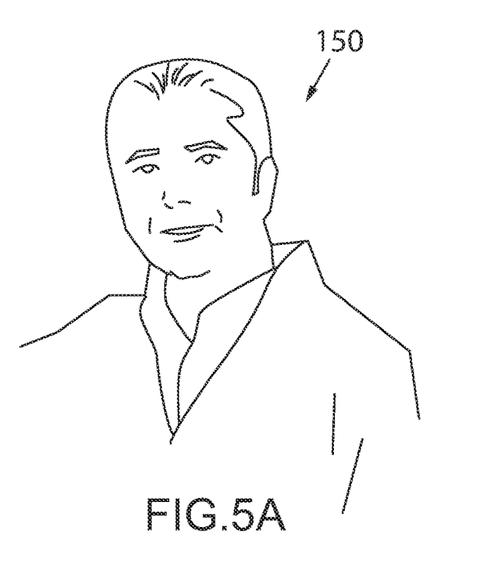
FIG. 5A is an exemplary image captured in a first spectrum.
Figure 5B:
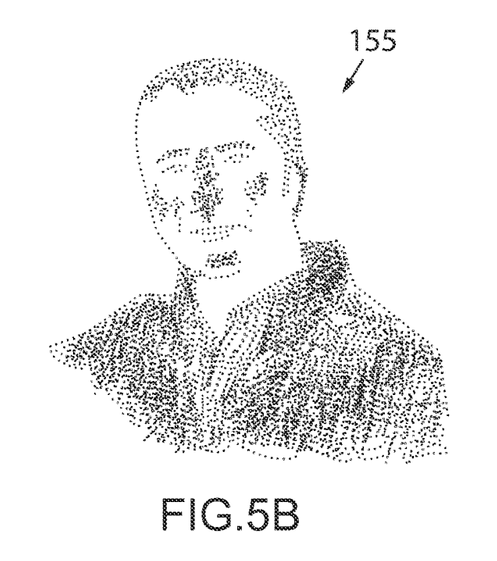
FIG. 5B is the exemplary image of FIG. 5A captured in a second spectrum.
Figure 6A:
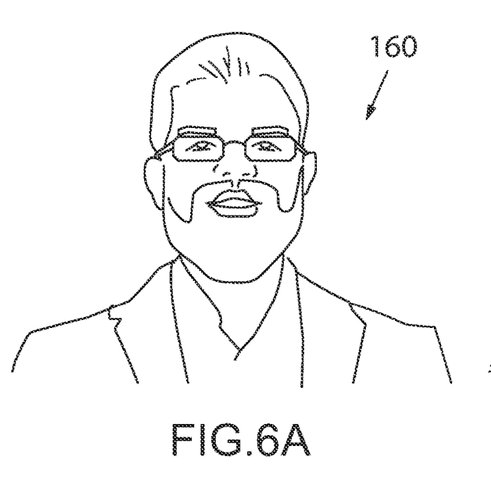
FIG. 6A is another exemplary image captured in the first spectrum.
Figure 6B:
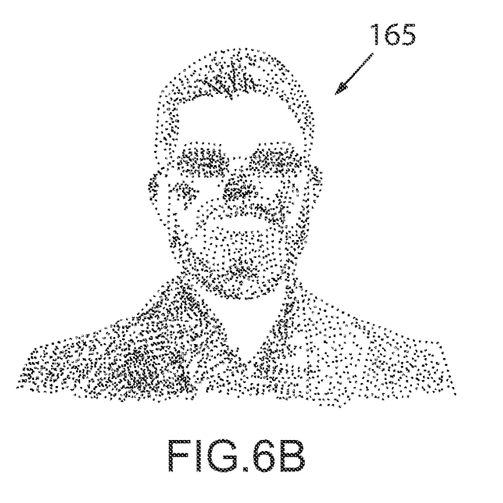
FIG. 6B is the exemplary image of FIG. 6A captured in the second spectrum.

Just as the face of each individual will generate a unique value or set of values in the visible spectrum, the face of each individual will similarly generate a unique value or set of values in other electromagnetic spectrums. The imaging device 12a may be configured to capture electromagnetic radiation, for example, in the ultraviolet or infrared spectrums. The infrared spectrum, for example, corresponds to heat radiated from an individual. FIGS. 5A and 5B illustrate an exemplary first image 150 of an individual captured in the visible spectrum (FIG. 5A) and an exemplary second image 155 of the same individual captured in the infrared spectrum (FIG. 5B). Similarly, FIGS. 6A and 6B illustrate an exemplary first image 160 of another individual captured in the visible spectrum (FIG. 6A) and an exemplary second image 165 of the other individual captured in the infrared spectrum (FIG. 6B). The infrared image of an individual is unique to an individual and cannot be imitated in a manner similar to a visible image. Physical attributes, such as an individual's hairline, facial hair, sinus cavities, or the like, impact the amount of heat radiated from an individual. Glasses reflect infrared radiation and appear as cool regions on an individual's face. Such personal attributes may be impossible, or at least very difficult, to copy in order to trick the monitoring device 12 into obtaining a fake infrared image corresponding to a printed image of a different individual.

Figure 7:
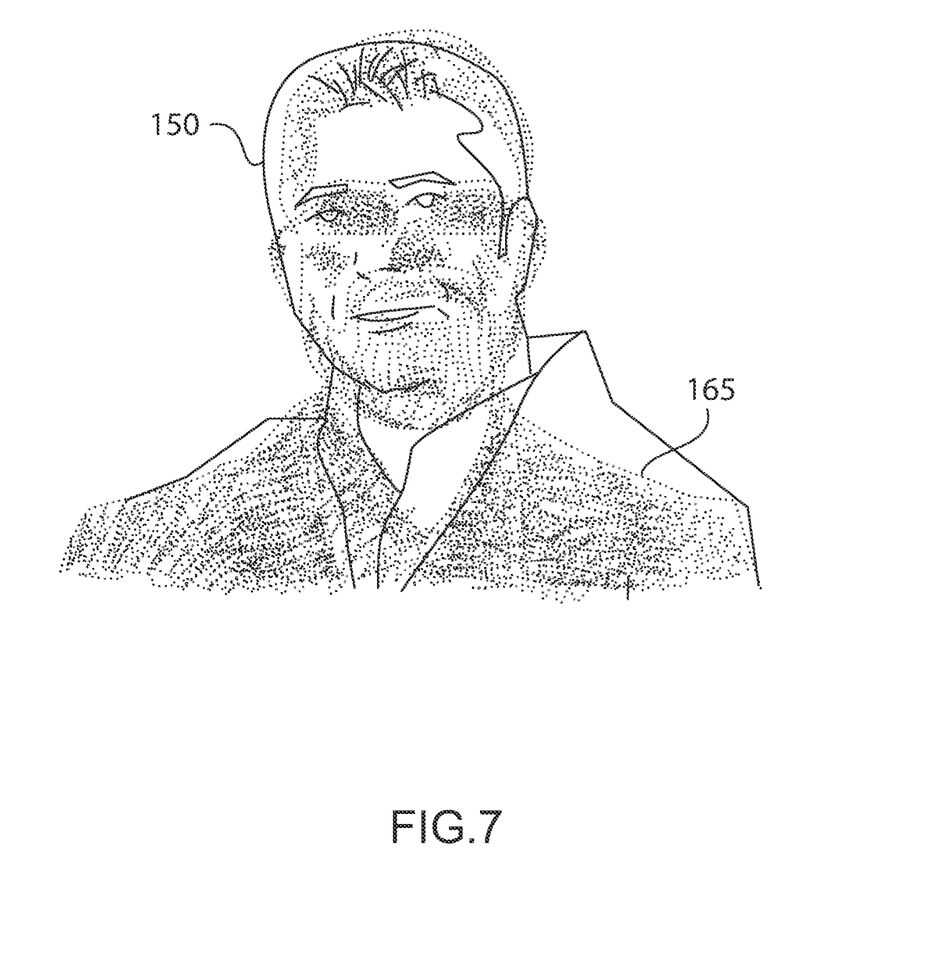
FIG. 7 is an example of an individual attempting to trick the monitoring system into a misidentification.

FIG. 7 illustrates an example of a first individual using a printed image, mask, or the like to present an image in the visible spectrum corresponding to a second individual. The individual shown in FIGS. 6A and 6B is holding up an image of the individual shown in FIGS. 5A and 5B to the monitoring device 12. The monitoring device 12 captures the image 150 of the first individual from the printed image. However, the monitoring device 12 also captures the infrared image 165 of the second individual. Although the second individual may hold up an image to trick the monitoring device 12 in the visible spectrum, the heat radiated from the second individual remains the same and is captured by the infrared sensor whether the second individual is holding up an image or is presenting his own face.

Figure 4:
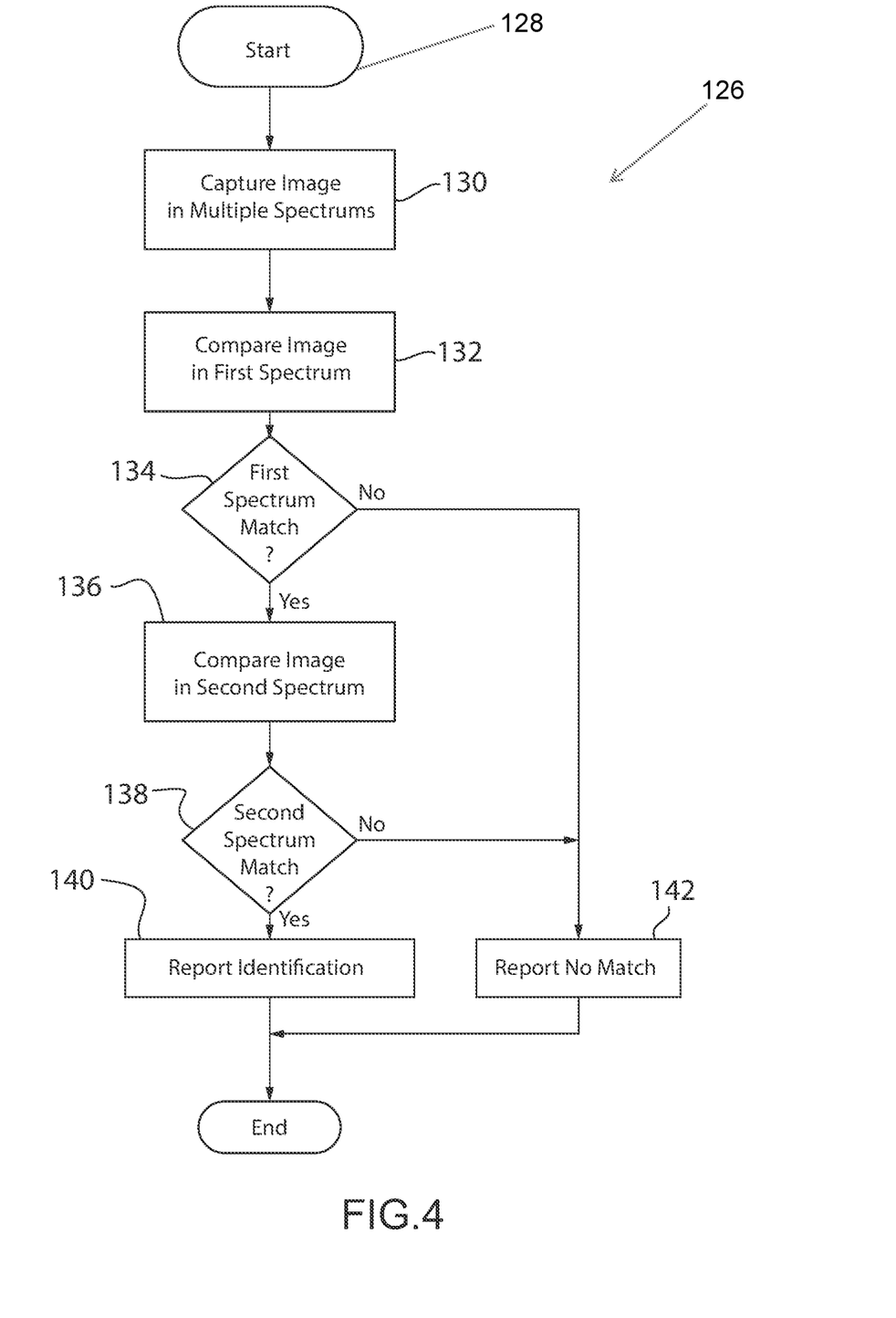
FIG. 4 is a flow diagram representing the facial recognition steps according to one embodiment of the invention.

With reference next to FIG. 4, an exemplary embodiment of a process 126 for facial recognition using multiple spectrums is illustrated. Process 126 proceeds from START at block 128 to block 130, where the imaging device 12*a* obtains images in two or more electromagnetic spectrums of an individual who has stepped into the field of view (66 and/or 67) of the imaging device 12*a*. The image capture element(s) (64 and/or 65) capture the entire field of view provided to the respective image capture element. The image corresponding to the entire field of view in each electromagnetic spectrum may be passed back to the base station 14 and on to the media server 58 for processing. Optionally, partial or complete processing may be performed in the imaging device 12*a* and/or base station 14. According to one embodiment of the invention, it is contemplated that the imaging device 12*a* and/or base station 14 may perform initial processing to detect the presence of a face within the field of view and extract the face of the individual from the field of view in both electromagnetic spectrums. Thus, a portion of the field of view corresponding to the detected image may be passed on to the base station 14 and/or media server 58 for subsequent facial recognition.

The CV program then utilizes the data captured by the imaging device 12*a* to determine if a detected face corresponds to data or a signature of an image stored in the storage device 59 in communication with the server 58 or in the memory storage 48 in communication with the processor 46 on the base station 14. At blocks 132 and 134, the CV program analyzes the image captured in a first electromagnetic spectrum to determine whether the captured image matches a stored image in the same electromagnetic spectrum. If there is no match identified at block 134, the controller may be configured to report that a face of an individual with no match has been detected, as indicated at 142. The controller may generate a notification to be transmitted to a user device 16 indicating the presence of an unrecognized person detected by the imaging device 12*a*. Optionally, the controller may be configured to take no specific action with respect to the detection of an unrecognized individual or, alternately, general action may be executed, for example, as a result of capturing an image or detecting motion with the imaging device 12*a*. If, however, there is a match identified at block 134, the process proceeds to blocks 136 and 138, wherein, where the CV program analyzes to the image captured in a second electromagnetic spectrum to determine whether it matches a corresponding stored image in the same electromagnetic spectrum. As previously indicated, a database of images includes pairs of stored images. The first image of each pair is captured in the first electromagnetic spectrum, and the second image of each pair is captured in the second electromagnetic spectrum. If no match is found at block 138, the CV program determines that either a false match occurred at the first matching operation or a likeness of another individual's image was used in the first matching operation. The controller, which, as discussed above, may be contained in whole or in part in the base station 14 and/or in the external server 58 of FIG. 1, may be configured to respond in one of several manners to matching a first image and not matching the second image. In a manner similar to failing to identify a match at block 134, the process 126 executed by the controller may proceed to block 142, a notice is generated and transmitted to a user device 16 indicating the presence of an unrecognized person detected by the imaging device 12*a*. Optionally, the controller may be configured to take no specific action with respect to the detection of an unrecognized individual or, alternately, general action may be executed, for example, as a result of capturing an image or detecting motion with the imaging device 12*a*. According to still another option, the controller may also be configured to indicate the potential attempt to create a false identification when an image is matched in the visible spectrum at block 134 but not in the second spectrum at block 138.

If, however, a match is found at block 138, the CV program has identified a positive match in both electromagnetic spectrums. At block 140, the process may cause a notification to be sent to the user device 16 indicating that such a match has been made. Further, the name of an individual may be stored in the database along with the first and second images. The name of the individual may also be transmitted to the user device 16 providing an indication to the user of the individual which was recognized by the imaging device 12*a*.

It is contemplated that the facial detection module executed by the CV may operate in combination with one or more additional modules to perform additional tasks or execute "smart home" function upon recognition of an image. In one possible mode of operation, the system 10 first operates in a person detection mode, in which incoming media is analyzed to determine if a person enters the field of view 66. Once a person is detected, the system uses the CV to analyze incoming media. Images captured by the CV may be stored to the database whether they are recognized or not. A user may access stored images via the user device 16 and assign names to images not yet identified. As described above, any images or videos may be saved for future review. The imaging device 12*a* may use the stored images to detect the identity of the individual using facial recognition technology as described above.

The system 10 can execute a given task in response to identifying an individual using the facial recognition technology. For instance, once CV identifies an individual, any number of tasks could be executed, including but not limited to, enabling or disabling an alarm or security system; sounding an alarm; contacting emergency service personal; turning off or on lights; powering or depowering various electronic devices; opening or closing a door; locking or unlocking a door; locking or unlocking a window; opening or closing a window; powering or depowering a smart outlet; and enabling or disabling communication such as over an intercom, phone, through the camera, or the like. The controller may store a series of tasks that can be assigned to an individual and may further be assigned, for example, based on a time of day at which the individual is detected.

Additionally, or alternatively, the task execution could take the form of sending a notification to one or more user devices, which then display(s) a corresponding notification in visual or audio form. The notification could take the form of a push notification, an email, a text, an automated phone call, etc. For instance, brief push messages may be transmitted in the form of a text or push notification based on the identified individual. Further, where the system 10 recognizes the user in front of the imaging device 12*a*, it can generate an even more personalized message that indicates who has been recognized, for example, "Jeff is at the front door", or "Amanda is here."

The system 10 may be programmed to perform the same action regardless of who is in front of the imaging device 12*a*. Alternatively, as mentioned above, the system 10 can utilize the facial recognition capabilities to create an even more customized response. For instance, the system 10 can use facial recognition capabilities of CV to confirm the identity of the user who is within the frame of the camera, and then execute a specific task based on the identified individual. By way of example, where the imaging device 12a is used at a home residence, the identities of each of the residents of the home and even frequent visitors may be recognized using the facial recognition features. Different actions can be used to execute different tasks depending on the identity of the detected individual. For instance, if a member of the immediate family is identified, the system 10 may be configured to lock or unlock a door. Similarly, certain actions may only be available to certain residents. For instance, recognized adults may be the only residents who are able to trigger locking or unlocking of a door. This would help to enhance the security features associated with the system 10.

To the extent that it may not be apparent from the forgoing, tasks may be executed even if a specific person is not identified in blocks 134 and 138. For example, if an unrecognized person is detected, the system 10 may execute a different task such as transmitting a push notification to a user device to the effect of: "UNKNOWN PERSON AT FRONT DOOR." The converse also is true. If a specific person is identified, a message may be pushed to the user device to the effect of "MARY DETECTED AT FRONT DOOR."

Accordingly, the invention provides a new and useful facial recognition system that may further automatically execute tasks in response to the detection of a particular individual. Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A method for real-time monitoring an area of interest with an electronic monitoring system, the method comprising the steps of:
    detecting a triggering event within the area of interest with a sensor;
    enabling a camera responsive to detecting the triggering event;
    receiving electromagnetic radiation in a first spectrum at a first sensor for the camera, wherein the first sensor receives the electromagnetic radiation directly from a lens for the camera;
    receiving electromagnetic radiation in a second spectrum at a second sensor for the camera, wherein the second sensor receives the electromagnetic radiation directly from the lens for the camera;
    generating a first video stream in the first spectrum with the first sensor, wherein the first video stream includes a plurality of images in the first spectrum;
    generating a second video stream in the second spectrum with the second sensor, wherein the second video stream includes a plurality of images in the second spectrum;
    transmitting the first video stream and the second video stream from the camera to a controller in communication with the camera;
    detecting a first facial image of a person with the controller, wherein the first facial image is located in a first image from the plurality of images within the first video stream;
    extracting the first facial image from the first image in the first video stream with the controller;
    generating a digital representation of the first facial image with the controller;
    using the controller, comparing the digital representation of the first facial image to a paired digital representation of at least one facial image stored in memory, wherein the paired digital representation for each facial image includes a first digital representation corresponding to the first spectrum and a second digital representation corresponding to the second spectrum;
    identifying a match between the digital representation of the first facial image and the first digital representation in one of the paired digital representations stored in memory;
    when the controller identifies the match, the method further comprises the steps of:
        identifying a second image of the person from the plurality of images within the second video stream, wherein the second image within the second video stream corresponds to the first image in the first video stream;
        extracting a second facial image from the second image, wherein the second facial image corresponds to the first facial image in the first image;
        generating a digital representation of the second facial image;
        comparing the digital representation of the second facial image to the second digital representation corresponding to the paired digital representation stored in the memory from which the match to the first facial image was identified; and
    using the controller, confirming a match between the person located in the first and second video streams with one of the paired digital representations only if the digital representation of both the first facial image and the second facial image match respective first and second digital representations stored in one paired digital representation.

2. The method of claim 1, wherein:
    the first sensor for the camera includes an array of first sensing elements configured to detect the electromagnetic radiation in the first spectrum; and the second sensor for the camera includes an array of second sensing elements configured to detect the electromagnetic radiation in the second spectrum.

3. The method of claim 1, further comprising generating a push notification to a user device when the potential match is confirmed.

4. The method of claim 3, further comprising storing an identifier corresponding to each paired digital representation for a facial image, and wherein the push notification includes the identifier.

5. The method of claim 1, wherein the first spectrum includes a visible spectrum of electromagnetic radiation, and the second spectrum includes an infrared spectrum of electromagnetic radiation.

6. The method of claim 1, further comprising executing a smart home function upon confirming the potential match.

7. The method of claim 2, wherein the array of first sensing elements is alternately arranged with the array of second sensing elements to define a single electromagnetic radiation capture element.

8. An electronic monitoring system with real-time facial identification, comprising:
   a sensor configured to detect a triggering event within an area of interest being monitored by the electronic monitoring system;
   a camera enabled by the triggering event, comprising:
      a lens configured to receive electromagnetic radiation from a field of view for the lens within the area of interest;
      a first sensor configured to receive the electromagnetic radiation directly from the lens to generate a first video stream from the field of view, wherein the first video stream includes a plurality of images in a first spectrum;
      a second sensor configured to receive the electromagnetic radiation directly from the lens to generate a second video stream from the field of view, wherein the second video stream includes a plurality of images in a second spectrum, and
      a first communication device configured to transmit the first video stream and the second video stream; and
   a gateway in communication with the first communication device and an external network, the gateway configured to receive the first and second video stream from the first communication device and to transmit the first and second video stream to the external network;
   a backend server in communication with the external network to receive the first and second video streams, the backend server further comprising:
   a memory configured to store a paired digital representation of at least one facial image, wherein the paired digital representation for each facial image includes a first digital representation corresponding to the first spectrum and a second digital representation corresponding to the second spectrum; and
   a controller configured to:
      receive the first video stream and the second video stream from the external network;
      detect a first facial image of a person located in a first image from the plurality of images within the first video stream;
      extract the first facial image from the first image in the first video stream;
      generate a digital representation of the first facial image;
      compare the digital representation of the first facial image to the paired digital representations stored in the memory; and
      identify a match between the digital representation of the first facial image and the first digital representation in one of the paired digital representations stored in memory;
      when the controller identifies the match, the controller is further configured to:
         identify a second facial image of the person from the plurality of images within the second video stream, wherein the second facial image within the second video stream corresponds to the first image in the first video stream;
         extract a second facial image from the second video stream, wherein the second facial image corresponds to the first facial image in the first video stream;
         generate a digital representation of the second facial image;
         compare the digital representation of the second facial image to the second digital representation from the paired digital representation stored in the memory from which the match to the first facial image was identified; and
      confirm the person located in the first and second video streams matches one of the paired digital representations stored in memory when the digital representations of the first and second facial images match respective first and second digital representations of the paired digital representation stored in memory.

9. The system of claim 8, wherein:
the first sensor in the camera includes an array of first sensing elements; and
the second sensor in the camera includes an array of second sensing elements.

10. The system of claim 8, wherein the controller is further configured to generate a push notification to a user device when the potential match is confirmed.

11. The system of claim 10, wherein the system is further configured to store an identifier corresponding to each paired digital representation for a facial image, and wherein the push notification includes the identifier.

12. The system of claim 8, wherein the first spectrum includes a visible spectrum of electromagnetic radiation, and the second spectrum includes an infrared spectrum of electromagnetic radiation.

13. The system of claim 8, wherein the controller is further configured to execute a smart home function upon confirming the potential match.

14. The system of claim 9, wherein the array of first sensing elements is alternately arranged with the array of second sensing elements to define a single electromagnetic radiation capture element.

15. An electronic monitoring system with real-time facial identification, comprising:
   a sensor configured to detect a triggering event within an area of interest being monitored by the electronic monitoring system;
   a monitoring device enabled by the triggering event, comprising:
      a lens configured to receive electromagnetic radiation from a field of view for the lens within the area of interest;
      a first sensor configured to receive the electromagnetic radiation directly from the lens to generate a first video stream from the field of view, wherein the first video stream includes a plurality of images in a first spectrum,
a second sensor configured to receive the electromagnetic radiation directly from the lens to generate a second video stream from the field of view, wherein the second video stream includes a plurality of images in a second spectrum, and
a first communication device configured to transmit the first video stream and the second video stream; and
a base station, comprising:
a memory configured to store a paired digital representation of at least one facial image, wherein the paired digital representation for each facial image includes a first digital representation corresponding to the first spectrum and a second digital representation corresponding to the second spectrum;
a second communication device, wherein the second communication device is complementary to and in communication with the first communication device to receive the first video stream and the second video stream from the monitoring device; and
a controller configured to:
detect a first facial image of a person located in a first image from the plurality of images within the first video stream;
extract the first facial image from the first image in the first video stream;
generate a digital representation of the first facial image;
compare the digital representation of the first facial image to the paired digital representations stored in the memory; and
identify a match between the digital representation of the first facial image and the first digital representation in one of the paired digital representations stored in memory;
when the controller identifies the match, the controller is further configured to:
identify a second facial image of the person from the plurality of images within the second video stream, wherein the second facial image within the second video stream corresponds to the first image in the first video stream;
extract a second facial image from the second image, wherein the second facial image corresponds to the first facial image in the first image;
generate a digital representation of the second facial image;
compare the digital representation of the second facial image to the second digital representation from the paired digital representation stored in the memory from which the match to the first facial image was identified; and
confirm the person located in the first and second video streams matches one of the paired digital representations stored in memory when the first facial image and the second facial image match the facial image for the first digital representation and the corresponding second digital representation for the facial image stored in the memory.

16. The system of claim 15, wherein:
the base station further comprises a third communication device configured to communicate with a server, and
at least some of the functions that the controller for the base station are configured to execute are performed on the server.

17. The system of claim 15, wherein the first spectrum includes a visible spectrum of electromagnetic radiation, and the second spectrum includes an infrared spectrum of electromagnetic radiation.

18. The system of claim 15, wherein:
the first sensor includes an array of first sensing elements;
the second sensor includes an array of second sensing elements; and
the array of first sensing elements is alternately arranged with the array of second sensing elements to define a single electromagnetic radiation capture element.

* * * * *